United States Patent
Persson et al.

(10) Patent No.: US 8,542,906 B1
(45) Date of Patent: Sep. 24, 2013

(54) AUGMENTED REALITY IMAGE OFFSET AND OVERLAY

(75) Inventors: Carl J. Persson, Olathe, KS (US); Thomas H. Wilson, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1019 days.

(21) Appl. No.: 12/124,826

(22) Filed: May 21, 2008

(51) Int. Cl.
*G06K 9/00* (2006.01)

(52) U.S. Cl.
USPC .......... 382/154; 382/275; 382/289; 382/103; 382/255; 382/291

(58) Field of Classification Search
USPC ......... 382/154, 275, 289, 103, 255, 291–292, 382/294
See application file for complete search history.

(56) References Cited

U.S. PATENT DOCUMENTS

| | | | |
|---|---|---|---|
| 6,166,744 A | 12/2000 | Jaszlics et al. | |
| 6,937,255 B2 | 8/2005 | Fukuda et al. | |
| 7,391,424 B2 | 6/2008 | Lonsing | |
| 7,671,875 B2 | 3/2010 | Anabuki et al. | |
| 2002/0075286 A1 | 6/2002 | Yonezawa et al. | |
| 2003/0080978 A1 | 5/2003 | Navab et al. | |
| 2005/0253870 A1 | 11/2005 | Kotake et al. | |
| 2006/0038833 A1 | 2/2006 | Mallinson et al. | |
| 2006/0071945 A1 | 4/2006 | Anabuki | |
| 2007/0008341 A1 | 1/2007 | Endo et al. | |
| 2007/0091125 A1 | 4/2007 | Takemoto et al. | |
| 2007/0242899 A1 | 10/2007 | Satoh et al. | |

OTHER PUBLICATIONS

Persson, Carl J., et al., Patent Application entitled "Markers to Implement Augmented Reality," filed Nov. 30, 2007, U.S. Appl. No. 11/948,655.
Office Action dated Oct. 13, 2010, U.S. Appl. No. 11/948,655, filed Nov. 30, 2007.
Advisory Action dated Sep. 7, 2011, U.S. Appl. No. 11/948,655, filed Nov. 30, 2007.
Final Office Action dated Apr. 15, 2011, U.S. Appl. No. 11/948,655, filed Nov. 30, 2007.
Final Office Action dated Jun. 28, 2011, U.S. Appl. No. 11/948,655, filed Nov. 30, 2007.
Examiner's Answer dated Jan. 31, 2012, U.S. Appl. No. 11/948,655, filed Nov. 30, 2007.

*Primary Examiner* — Kim Vu
*Assistant Examiner* — Ruiping Li

(57) ABSTRACT

A method is provided to implement augmented reality using markers. An image is captured of an environment. An image of a marker is detected in the image of the environment. A virtual image is displayed overlaid on the image of the environment at an offset from the marker, wherein the virtual image is based on the marker.

18 Claims, 9 Drawing Sheets

AUGMENTED REALITY IMAGE OFFSET AND OVERLAY

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Augmented reality (AR) is a field of computer applications which deals with the combination of real world images and computer generated data. Many augmented reality applications are concerned with the use of live video imagery which is digitally processed and augmented by the addition of computer generated graphics. For instance, an augmented reality user may wear translucent goggles through which the user may see the real world as well as computer-generated images projected on top of that real world.

For example, virtual chess pieces may be overlaid on top of an empty chess board that is depicted as a camera image. The computer that overlays the virtual chess pieces must know where the camera is relative to the chess board in order to know how to augment the image correctly. One way to achieve this is through the use of markers, which may be a two dimensional bar code such as the circular ShotCode, or any asymmetrical pattern. Markers are put in the scene so that when these markers are recognized in the camera image, the computer rendering the virtual chess pieces knows the position and angle to render virtual chess pieces and draw them over the camera image so that the virtual chess pieces appear natural to the viewer looking at the camera image.

SUMMARY

In some embodiments, a method is provided to implement augmented reality using markers. An image is captured of an environment. An image of a marker is detected in the image of the environment. A virtual image is displayed overlaid on the image of the environment at an offset from the marker, wherein the virtual image is based on the marker.

In other embodiments, a system is provided to implement augmented reality using markers. The system includes at least one processor, a camera associated with a mobile device, a plurality of instructions in a memory, and a user interface associated with the mobile device. The camera captures an image of an environment. The plurality of instructions, when executed by the at least one processor, detect an image of a marker in the image of the environment. The user interface displays a virtual image overlaid on the image of the environment, wherein a plane of the virtual image is displayed parallel to a plane of a display associated with the user interface.

In still other embodiments, a method is provided to implement augmented reality using markers. An image is captured of an environment. An image of a marker is detected in the image of the environment. A virtual image is displayed overlaid on the image of the environment, wherein the virtual image is based on the marker, and wherein the virtual image is displayed at least partially over the marker and over another portion of the image of the environment.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
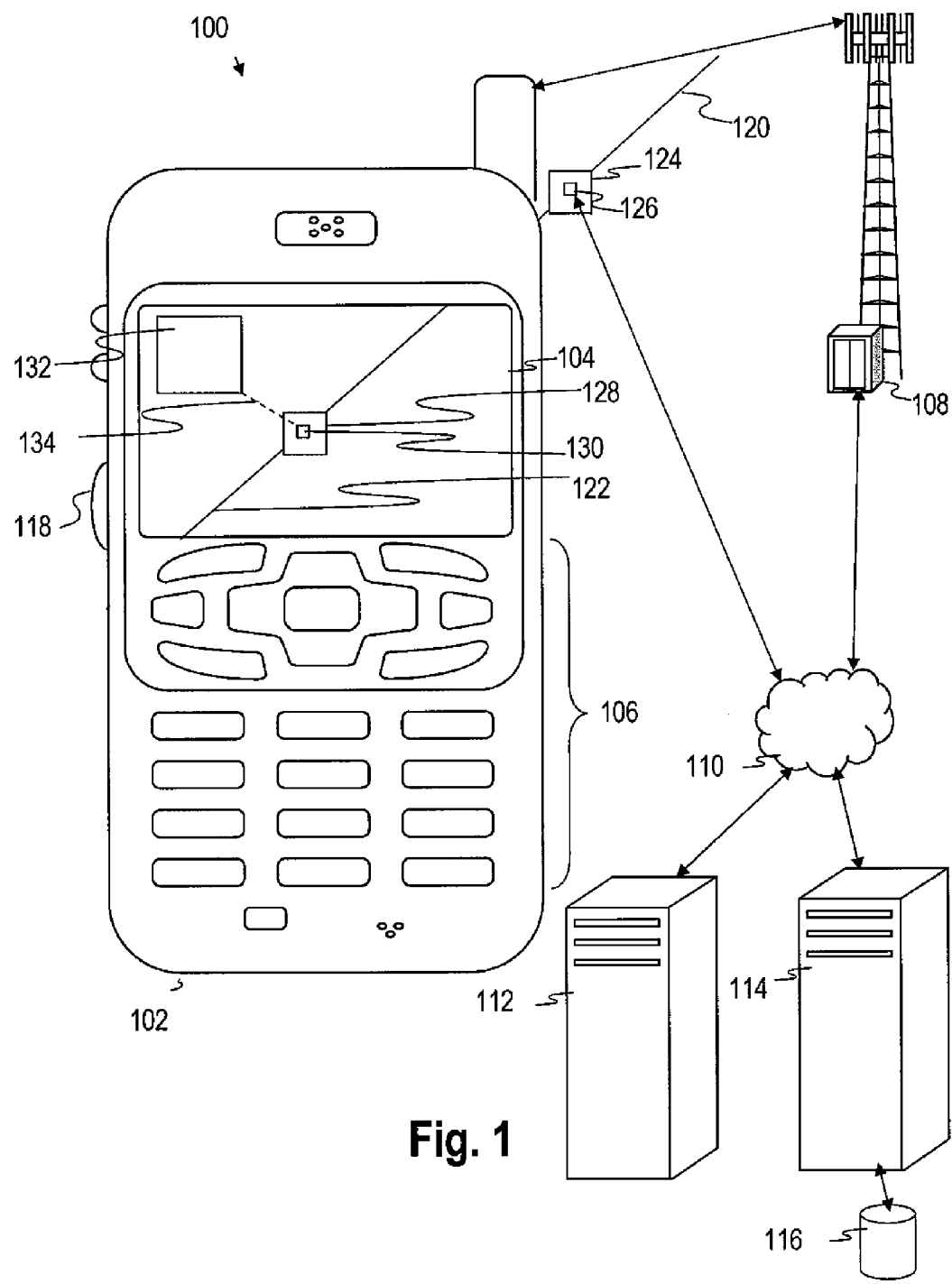
FIG. 1 shows an illustrative wireless communications system for markers to implement augmented reality according to some embodiments of the present disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In embodiments of the present disclosure, methods and systems are provided for markers to implement augmented reality. A mobile device display may overlay a virtual image on an image of a marker in an environment that is visually cluttered, such as a virtual image of a price discount overlaid on a marker on a box of children's cereal that is located on a shelf that is crowded with many colorful boxes of children's cereal. Alternatively, the mobile device may overlay the virtual image at an offset from the image of the marker, such as overlaying the virtual image of the price discount offset above the top of the corresponding children's cereal box, where the mobile device user may easily see the virtual image of the price discount uncluttered by the background of its environment. If a mobile device user is walking down an aisle of items that have markers, the mobile device user may not be able to read the virtual images that are overlaid on the images of the markers due to the sharp viewing angle between the perspective of the mobile device and the markers. By overlaying the virtual images at an offset from the images of the markers, the mobile device may display the virtual images in a plane that is parallel to the plane of the mobile device display, which makes viewing and reading the virtual image much easier for the mobile device user. The mobile device may also overlay virtual images of portions of items that are not visible at an offset from the images of the markers on the items. For example, if only a portion of a boiler is visible above a factory floor, the mobile device may overlay an image of the portion of the boiler that is below the factory floor at an offset from a marker on the boiler, where the offset results in the virtual image of the portion of the boiler that is below the factory floor lining up with the visible portion of the boiler that is above the factory floor. The mobile device displaying both the visible portion of the boiler and a virtual image of the portion of the boiler that is not visible may enable a factory worker to completely trace boiler pipes that are only partially visible to solve a problem with the boiler. The virtual image may be overlaid partially over the marker and another portion of the image of the environment. For example, the mobile device may overlay a virtual image of a transparent green cover on an image of a refrigerator and its marker to indicate that a database of information associated with the refrigerator's marker indicates that the refrigerator matches user selected refrigerator requirements.

FIG. 1 shows a wireless communications system 100 that illustrates an embodiment of the present disclosure's systems and methods. The wireless communication system 100 includes an illustrative mobile device 102. Though illustrated as a mobile phone, the mobile device 102 may take various forms including a personal digital assistant (PDA), a mobile handset, a wireless mobile device, a pager, a mobile computer, a portable computer, a tablet computer, a laptop computer, a digital camera, a mobile phone or mobile telecommunication device, a handheld gaming device, a digital calculator, a digital music player, and a headset with goggles, lenses, glasses, or similar viewing devices. Many suitable mobile devices combine some or all of these functions.

The mobile device 102 includes a display 104 and a touch-sensitive surface or keys 106 with which a user can interact. The mobile device 102 may present options for the user to select, controls for the user to actuate, and/or cursors or other indicators for the user to direct. The mobile device 102 may further accept data entry from the user, including numbers to dial or various parameter values for configuring the operation of the mobile device 102. The mobile device 102 may further execute one or more software or firmware applications in response to user commands. These applications may configure the mobile device 102 to perform various customized functions in response to user interaction, such as selecting from virtual image options. In some embodiments, the mobile device 102 may take various forms with a screen size reduced to a maximum of four inches by six inches, including a mobile telecommunication device, a mobile handset, a personal digital assistant, a handheld gaming device, a wireless mobile device, a pager, a digital camera, a digital music player, a digital calculator, a mobile phone, and a headset with at least one of goggles, lenses, and glasses.

The mobile device 102 communicates through a base transceiver station 108 and a wired or wireless network 110 to access information on various servers, such as a communication server 112 and a content server 114. The content server 114 may provide content that may be shown on the display 104, such as virtual images. The content server 114 may access a database 116 of virtual images that may be shown on the display 104. The database 116 may reference markers and virtual images, wherein each of the virtual images is associated with at least one of the markers. In some embodiments, the function of the content server 114 and the database 116 is incorporated in the mobile device 102 instead of in the content server 114 and the database 116 that communicate with the mobile device 102. While one base transceiver station 108 is shown in FIG. 1, other base transceiver stations 108 could be present.

Figure 6:
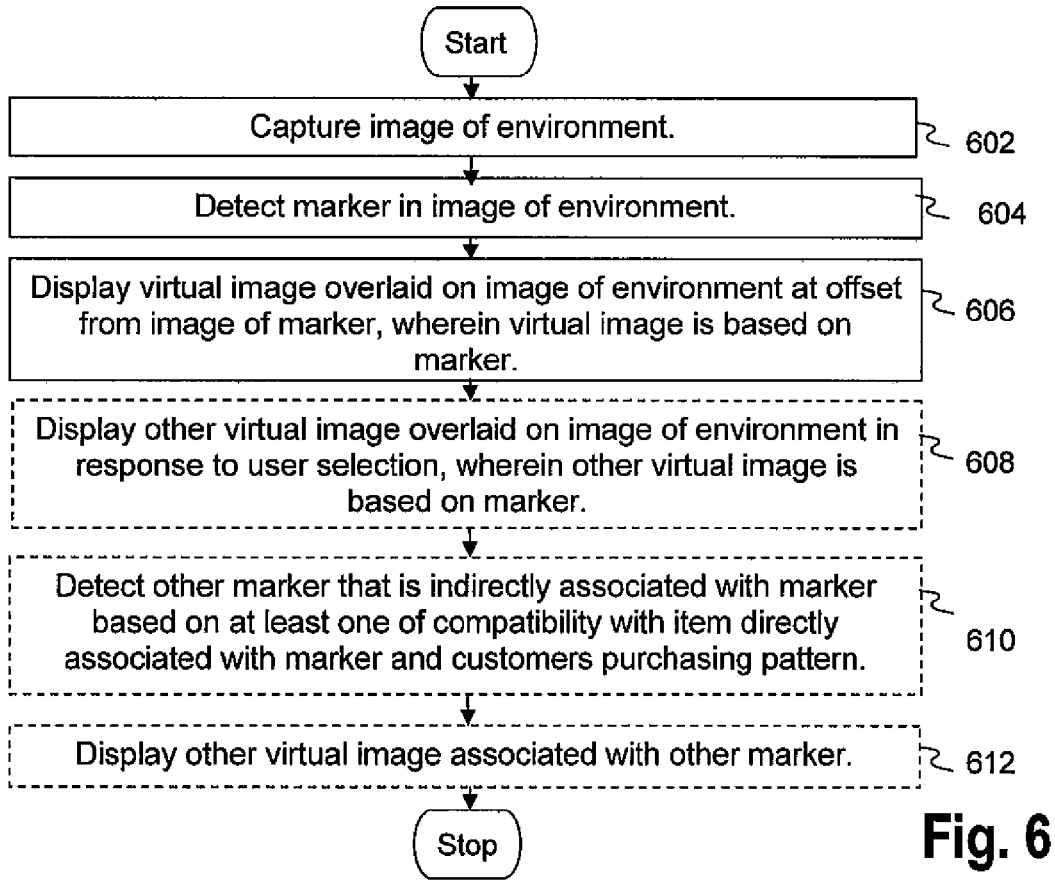
FIG. 6 is a flowchart of a method for markers to implement augmented reality according to some embodiments of the present disclosure.

The mobile device 102 includes a camera 118 that can capture images of an environment 120, whereby an image 122 of the environment 120 may be viewed through the display 104. In FIG. 1, the camera 118 is depicted on the side of the mobile device 102, but the camera 118 may be located anywhere on the mobile device 102, such as on the opposite side of the mobile device 102 from the display 104. When the environment 120 includes an item 124 associated with a marker 126, the image 122 of the environment 120 may include an image 128 of the item 124 and an image 130 of the marker 126. The marker 126 may be any of an asymmetrical pattern, a moving marker, a two dimensional bar code, a ShotCode, a SEMACODE, a color light pattern, a primary marker assigned to a marker hierarchy, a secondary marker assigned to the marker hierarchy, and/or a dependent marker assigned to the marker hierarchy. The color light pattern may be a combination of different colors of light that are arranged in a manner that uniquely identifies a marker. A marker hierarchy is a designated sequence in which virtual images are overlaid on markers, such as the hierarchy for markers described below in reference to box 608 (FIG. 6). If the marker 126 is displayed by an updateable digital marker display, the updateable digital marker display may communicate with the content server 114 and the database 116 via the network 110. Either the mobile device 102, and/or the content server 114 in conjunction with the database 116, may overlay a virtual image 132 on the image 122 of the environment 120 at an offset 134 from the image 130 of the marker 126 based on the image 130 of the marker 126. Overlaying the virtual image 132 at the offset 134 from the image 130 of the marker 126 may result in displaying the virtual image 132 at least partially over the image 130 of the marker 126 and over the image 122 of the environment 120 while leaving at least part of the image 130 of the marker 126 not overlaid.

Figure 2:
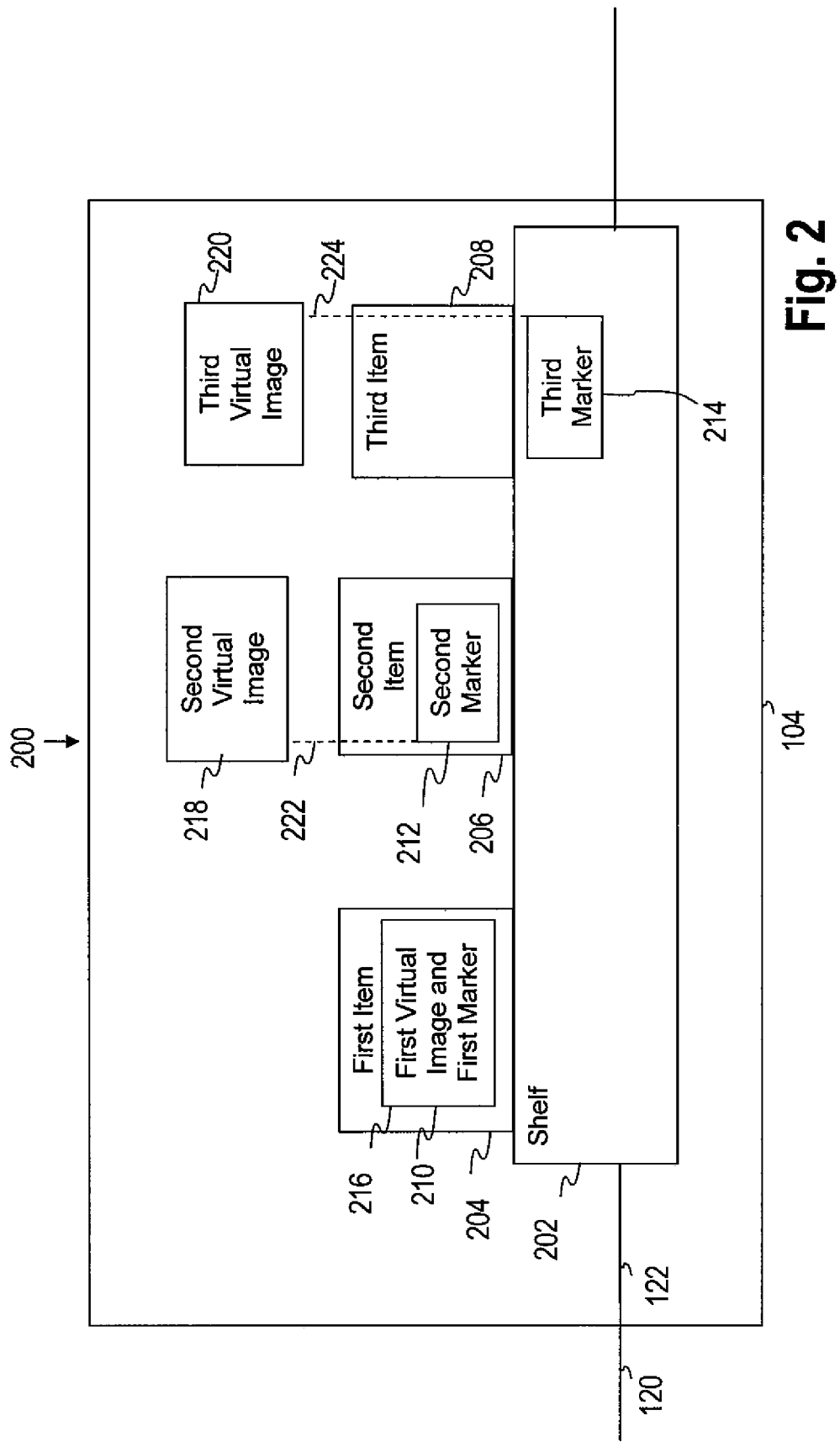
FIG. 2 shows a view of a graphic user interface for markers to implement augmented reality according to some embodiments of the present disclosure.

FIG. 2 shows a view 200 of a graphic user interface for markers to implement augmented reality according to some embodiments of the present disclosure. The view 200 includes the display 104, the environment 120, an image 122 of the environment 120, an image of a shelf 202, an image of a first item 204, an image of a second item 206, an image of a third item 208, an image of a first marker 210, an image of a second marker 212, an image of a third marker 214, a first virtual image 216, a second virtual image 218, a third virtual image 220, a first offset 222, and a second offset 224. Either the mobile device 102, and/or the content server 114 in conjunction with the database 116, may overlay the virtual images 216-220 on the image 122 of the environment 120 based on the location of the mobile device 102, more specifically the camera 118 for the mobile device 102, in relation to the location of the images of the markers 210-214 in the environment 120. Each of the virtual images 216-220 may be an image, navigational information, an advertisement, information about the items 206-208 in the image 122 of the environment 120, an outline of an item associated with a corresponding marker, or colors that indicate a level of matching.

For example, the mobile device 102 is located such that the camera 118 captures the image of the first item 204 and the image of the first marker 210, which may be a ShotCode. The mobile device 102 reads data-bits from the ShotCode, which is a dartboard-like circle, with a bullseye in the center and data-circles surrounding it, by measuring the angle and distance from the bullseye for each data-circle. The mobile device 102 communicates the data from the image of the first marker 210 to the content server 114 via the network 110, and the content server 114 identifies a virtual image in the database 116 that corresponds to the image of the first marker 210. The content server 114 communicates the corresponding virtual image to the mobile device 102 via the network 110, and the mobile device 102 overlays the first virtual image 216 on the image 122 of the environment 120 over the image of the first marker 210. In this example, if the first item 204 is a box of candy and the image of the first marker 210 is a trademarked pattern that is specific to the particular box of candy, the mobile device 102 overlays the first virtual image 216, which may be a price discount image for the candy, over the image of the first marker 210. The image of the first marker 210 may be a SEMACODE, which is a machine-readable dot matrix symbol that encodes an internet uniform resource locator (URL). An image of the SEMACODE may be captured by the camera 118 and decoded to obtain a web site address. The mobile device 102 may access this address via the mobile device's web browser to obtain the virtual image that corresponds to the image of the first marker 210.

In another example, when the mobile device 102 is located such that the camera 118 captures the image of the second item 206 and the image of the second marker 212, the mobile device 102 overlays the second virtual image 218 on the image 122 of the environment 120 at the first offset 222 from the image of the second marker 212. In this example, the second item 206 is a box of children's cereal and the image of the second marker 212 is a pattern specifically designed for the second virtual image 218 that corresponds to the box of children's cereal. The mobile device 102 overlays the second virtual image 218, which may be an advertisement for the children's cereal, at the first offset 222 from the image of the second marker 212.

In yet another example, when the mobile device 102 is located such that the camera 118 captures the image of the third item 208 and the image of the third marker 214, the mobile device 102 overlays the third virtual image 220 on the image 122 of the environment 120 at the second offset 224 from the third marker 214. In this example, the image of the third marker 214 is not detected on the image of the third item 208, but detected on the shelf 202 below the image of the third item 208, such as on a promotional display area. If the third item 208 is a box of health-oriented cereal and the image of the third marker 214 displays a pattern that is specific to the particular box of health-oriented cereal, the mobile device 102 overlays the third virtual image 220, which may be information about the health-oriented cereal, above the shelf 202 and above the image of the third item 208 at a the second offset 224 from the image of the third marker 214.

Figure 3:
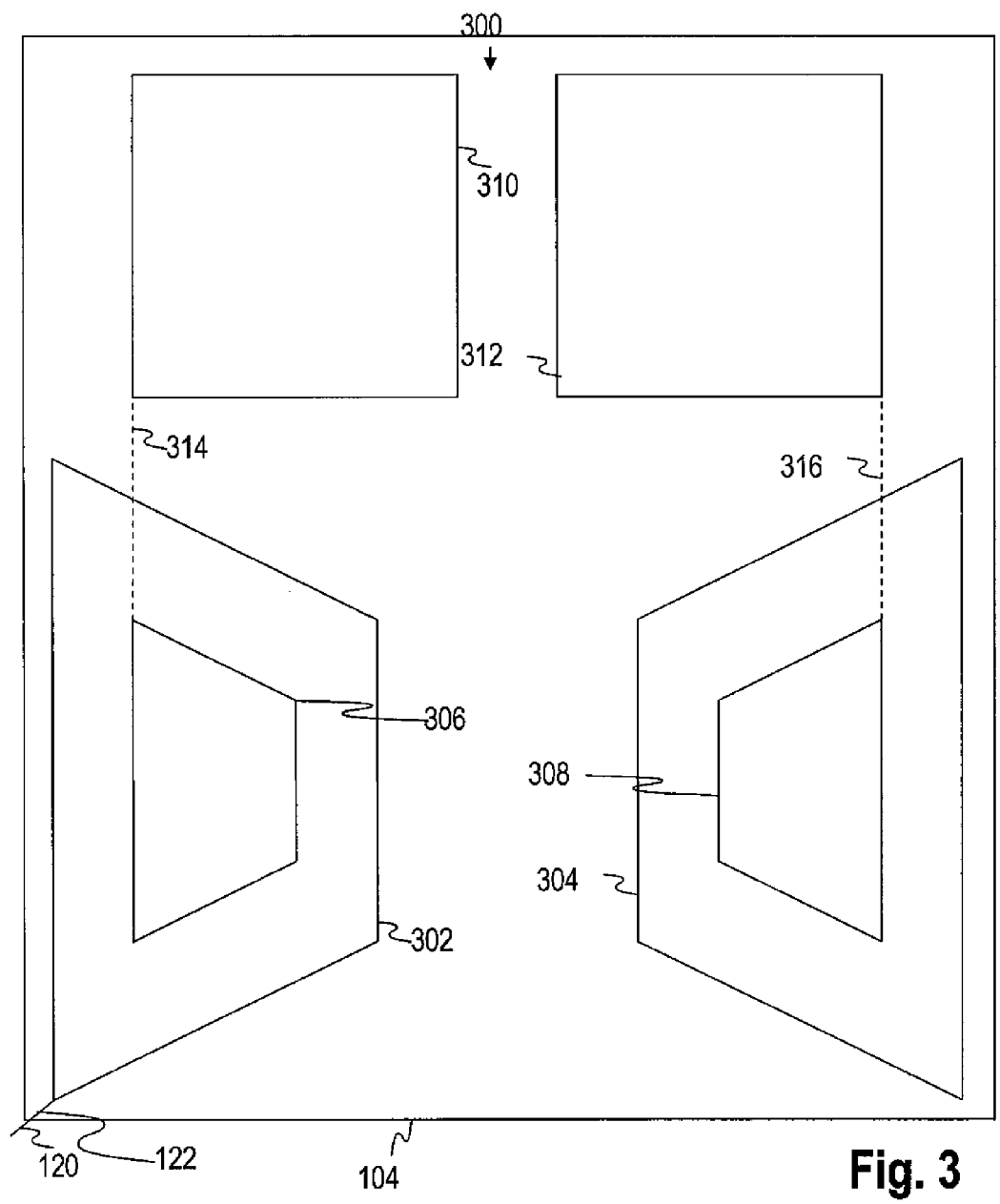
FIG. 3 shows a view of another graphic user interface for markers to implement augmented reality according to some embodiments of the present disclosure.

FIG. 3 shows a view 300 of another graphic user interface for markers to implement augmented reality according to some embodiments of the present disclosure. The view 300 includes the display 104, the environment 120, the image 122 of the environment 120, an image of a first item 302, an image of a second item 304, an image of a first marker 306, an image of a second marker 308, a first virtual image 310, a second virtual image 312, a first offset 314, and a second offset 316. When the mobile device 102 is located such that the camera 118 captures an image of the first marker 306, the mobile device 102 may overlay the first virtual image 310 on the image 122 of the environment 120 at the first offset 314 from the image of the first marker 306. The first item 302, for example a large screen television, and the first marker 306 are situated in a warehouse aisle at an angle from the camera 118 that may make correctly capturing the images of the first item 302 and the first marker 306 challenging. To compensate for the angle of the items 302-304 in the aisle from the camera 118, the mobile device 102 overlays the first virtual image 310, specification information for the large screen television, in a plane that is parallel to the plane of the display 104 for the mobile device 102, which enables a user of the mobile device 102 to identify the first virtual image 310 more easily. If the first virtual image 310 was overlaid in a plane that is parallel to the plane for the first item 302 and the first marker 306, the user of the mobile device 102 may be challenged in identifying the first virtual image 310, which may make reading the specification information for the large screen television somewhat difficult. The mobile device 102 may overlay the second virtual image 312 on the image of the second marker 308 or at the second offset 316 from the image of the second marker 308.

Figure 4:
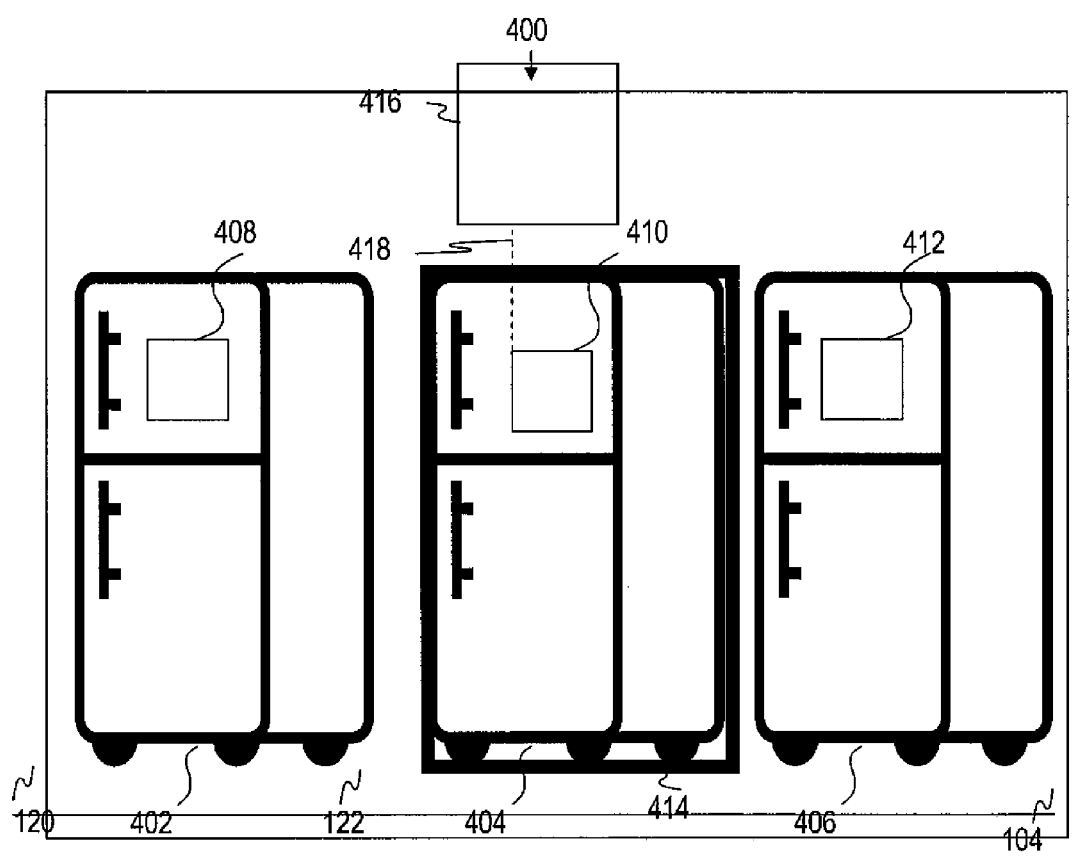
FIG. 4 shows a view of yet another graphic user interface for markers to implement augmented reality according to some embodiments of the present disclosure.

FIG. 4 shows a view 400 of another graphic user interface for markers to implement augmented reality according to some embodiments of the present disclosure. The view 400 includes the display 104, the environment 120, the image 122 of the environment 120, an image of a first item 402, an image of a second item 404, an image of a third item 406, an image of a first marker 408, an image of a second marker 410, an image of a third marker 412, a first virtual image 414, a second virtual image 416, and an offset 418.

For example, when the mobile device 102 is located such that the camera 118 captures the image of the second marker 410 on the second item 404, which is a refrigerator, the mobile device 102 overlays the first virtual image 414, which may be a green outline or a transparent green cover, on the image of the second marker 410 and the image of the second item 404. The first virtual image 414 may be a green outline or a transparent green cover that is overlaid on the image of the first item 402 to indicate that the first item 402 matches specifications for the items 402-406 entered by the user of the mobile device 102 via the keys 106. In addition to the first virtual image 414, the mobile device 102 may overlay the second virtual image 416, which may be detailed product information, at the offset 418 from the image of the second marker 410.

Figure 5:
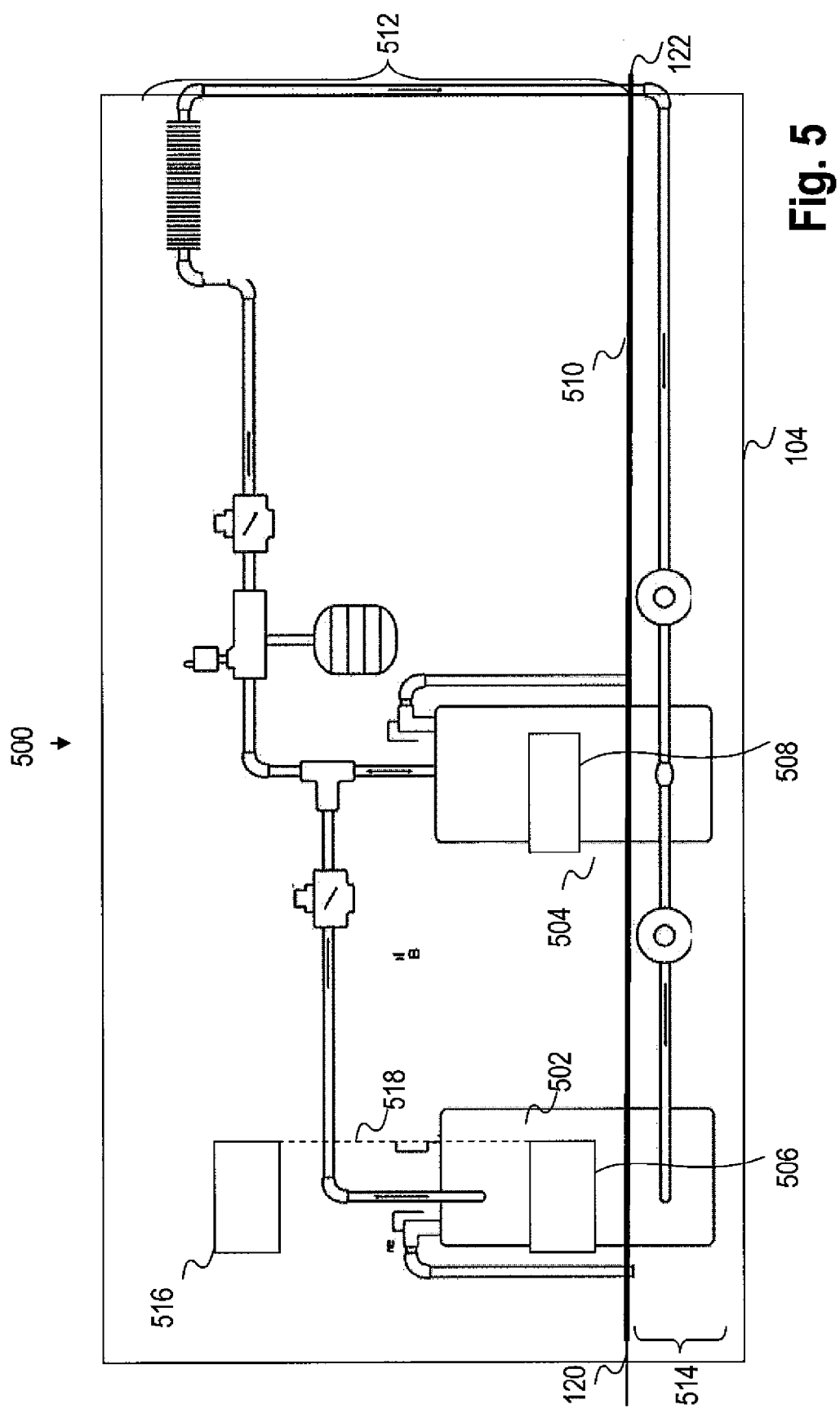
FIG. 5 shows a view of an additional graphic user interface for markers to implement augmented reality according to some embodiments of the present disclosure.

FIG. 5 shows a view 500 of an additional graphic user interface for markers to implement augmented reality according to some embodiments of the present disclosure. The view 500 includes the display 104, the environment 120, the image 122 of the environment 120, an image of a first item 502, an image of a second item 504, an image of a first marker 506, an image of a second marker 508, a floor 510, an above-floor portion 512 of the environment 120, a below-floor portion 514 of the environment 120, a virtual image 516, and an offset 518.

For example, when the mobile device 102 is located such that the camera 118 captures an image of the first marker 506 on the image of the first item 502, which is a boiler in a factory, the mobile device 102 overlays the virtual image 516, which may be current operating information for the boiler, on the image 122 of the environment 120 at the offset 518 from the image of the first marker 506. For this example, the virtual image 516 may specify the operational status of the boiler, such information that identifies whether the boiler's temperature is excessively hot, whether the boiler needs maintenance, and whether the boiler needs a re-supply of a consumable material, such as the boiler's fuel. The virtual image 516 may also include a history associated with the first item 502, such as the maintenance history for the boiler. Additionally, the virtual image 516 may include instructions, such as procedures for providing boiler maintenance and a troubleshooting chart that lists actions to take in response to the most common problems. The mobile device 102 may overlay the virtual image 516 on the image of the first marker 506 or overlay the virtual image 516 at the offset 518 from the image of the first marker 506.

It will be readily appreciated that the disclosed concept could be extended to other devices besides boilers, for example to electric motors, to hydraulic pumps, to injection plastic mold machines, to computer numerical control (CNC) machines, to assembly line robotic devices, to conveyor systems, to weaving machinery, to food preparation and processing machinery, to beverage processing machinery, to printing presses, to motor vehicles, to chemical reactor vessels, to refinery equipment, to steam turbine generators, to hydroelectric generators and pumps, and to many other devices, all of which are contemplated by the present disclosure.

In response to detecting the images of the markers 506 and 508, the mobile device 102 may overlay a virtual image of the below-flow portion 514 of the environment 120 on the image 122 of the environment 120 based on the location of the mobile device 102 in relation to the location of the image of the markers 506-508 in the environment 120. The virtual image of the below-flow portion 514 may be a schematic drawing that shows the plumbing beneath the floor of the factory, or an electrical schematic of wires and cables beneath the factory floor. In other examples, virtual images may show an electrical schematic of the wires and cables inside equipment and/or inside walls. Overlaying the virtual image of the below-flow portion 514 of the environment 120 may be a user-selected response to detecting the images of the markers 506 and 508.

FIG. 6 is a flowchart of a method for markers to implement augmented reality according to some embodiments of the present disclosure. The mobile device 102 can use the method to display a virtual image at an offset from an image of a marker.

In box 602, an image is captured of an environment. For example, the camera 118 captures the image 122 of the environment 120, which includes the image of the shelf 202, the images of the items 204-208 and the images of the markers 210-214.

In box 604, an image of a marker is detected in the image of the environment. For example, the mobile device 102 detects the image of the second marker 212 on the image of the second item 206.

In box 606, a virtual image is displayed overlaid on the image of the environment at an offset from the image of the marker, wherein the virtual image is based on the marker. For example, the display 104 displays the second virtual image 218 of an animated cartoon character that is associated with the second item 206, which is children's cereal, at the first offset 222 from the second marker 212. An amount of the offset may be based on a marker. For example, the second marker 212 indicates for the mobile device 102 to display the second virtual image 218 at the first offset 220 above the image of the second marker 212, where the first offset 222 is equal to 120% of the height of the second item 206 in the image 122 of the environment 120. The second virtual image 218 may be displayed at least partially over the second marker 212 and over another portion of the image 122 of the environment 120. For example, the display 104 displays the second virtual image 218 of an animated cartoon character at least partially over the second marker 212, where at least part, or possibly all, of the second marker 212 is not overlaid. Displaying the second virtual image 218 at the first offset 222 from the second marker 212 results in the animated cartoon character being displayed sufficiently high above the children's cereal box for the user of the mobile device 102 to clearly see the second virtual image 218.

In box 608, another virtual image is displayed overlaid on the image of the environment in response to a user selection, wherein the other virtual image is based on the marker. For example, the display 104 displays the virtual image of the below-floor portion 514 of the environment 120 in response to a user selection, wherein the virtual image of the below-floor portion of the boilers 502-504 is based on the combination of the images of the markers 506-508. The image of the marker 506 for the first boiler 502 may serve as a primary marker for the below-floor portion of the boilers 502-504, while the image of the marker 508 for the second boiler 504 may serve as a secondary marker for the below-floor portion of the boilers 502-504. When the user views the image 122 of the environment 120 in the factory, the mobile device 102 detects the primary and the secondary markers 506-508, but does not display virtual images associated with the combination of the primary and the secondary markers 506-508 when the mobile device 102 is configured to display only the virtual images based on the primary marker 506 and the secondary marker 508 individually. However, the mobile device 102 offers options via the display 104 for the user to select to also display virtual images corresponding to combinations of markers, such as the markers 506-508.

The mobile device 102 may also detect secondary or dependent markers in the image 122 of the environment 120 that may be selected to display a sub-portion of a virtual image associated with a secondary marker. For example, when the mobile device 102 displays a virtual image of the below-floor portion of the boilers 502-504, the mobile device 102 may also detect secondary markers and offer to let the user select between displaying only plumbing pipes that input water into the boilers 502-504 or only plumbing pipes that exhaust steam from the boilers 502-504, with each sub-section independently displayed based on a different user selection.

Displaying the virtual image may be based on a progressive algorithm for the marker, wherein a first virtual image is based on a first marker, a second virtual image is based on a second marker, and a third virtual image is based on a combination of the first marker and the second marker. For example, the first virtual image 516 is based on the first marker 506, a second virtual image is based on the second marker 508, and a third virtual image of the below-floor portion of the boilers 502-504 is based on a combination of the first marker 506 and the second marker 508.

In box 610, another marker is detected that is indirectly associated with the marker based on at least one of compatibility with an item directly associated with the marker and customers purchasing pattern. For example, the mobile device 102 detects the image of a marker for a children's breakfast drink that is indirectly associated with the second marker 212 for the second item 206, which is the children's cereal. Alternatively, the other marker may be for a children's snack indirectly associated with the second marker 212 for the second item 206 based on customers purchasing patterns, which indicate that an unusually high percentage of customers who purchased the children's breakfast cereal also purchased the children's snack.

In box 612, another virtual image associated with the other marker is displayed. For example, the mobile device 102 displays another virtual image, which is an advertisement that encourages customers to purchase either the children's breakfast drink or the children's snack in addition to purchasing the children's cereal.

Figure 7:
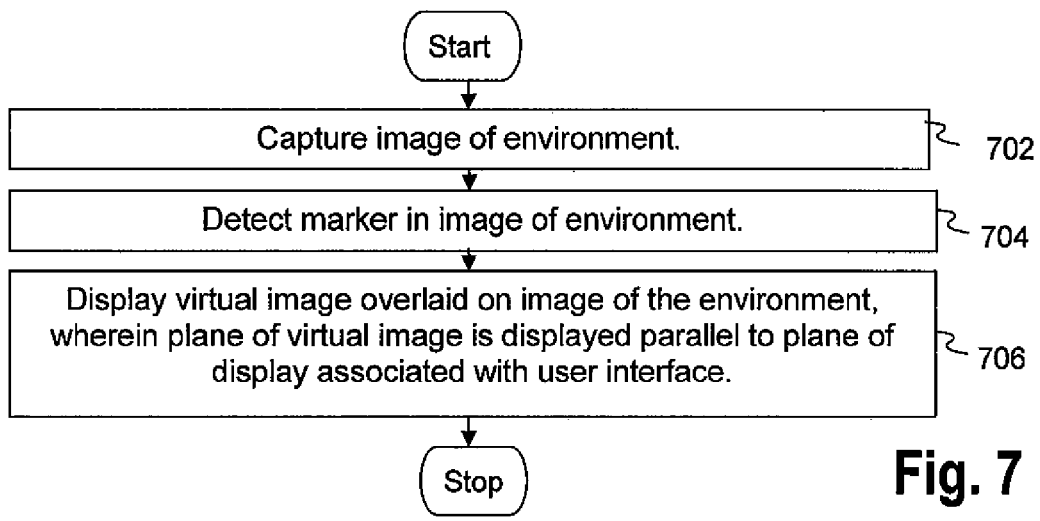
FIG. 7 is another flowchart of a method for markers to implement augmented reality according to some embodiments of the present disclosure.

FIG. 7 is another flowchart of a method for markers to implement augmented reality according to some embodiments of the present disclosure. The mobile device can use the method to display virtual images clearly even when the corresponding markers are at a sharp angle from the camera.

In box 702, an image of an environment is captured. For example, the camera 118 captures the image 122 of the environment 120 that includes the markers 306-308 on the images of the large screen televisions 302-304 while the user of the mobile device 102 walks down an aisle in a warehouse.

In box 704, an image of a marker is detected in the image of the environment. For example, the mobile device 102 detects the markers 306-308 even though the markers 306-308 are at sharp angles from the camera 118 on the mobile device 102.

In box 706, a virtual image is displayed overlaid on the image of the environment, wherein a plane of the virtual image is displayed parallel to a plane of a display associated with the user interface. For example, the display 104 displays the virtual images 310-312, which include detailed product information about the large screen televisions 302-304, in planes that are parallel to the plane of the display 104 for the mobile device 102. While the user of the mobile device 102 may have a difficult time reading product information on the large screen televisions 302-304 due to the sharp angles that the large screen televisions 302-304 are situated from the user, the virtual images 310-312 are overlaid in planes that are easy for the user to read.

Figure 8:
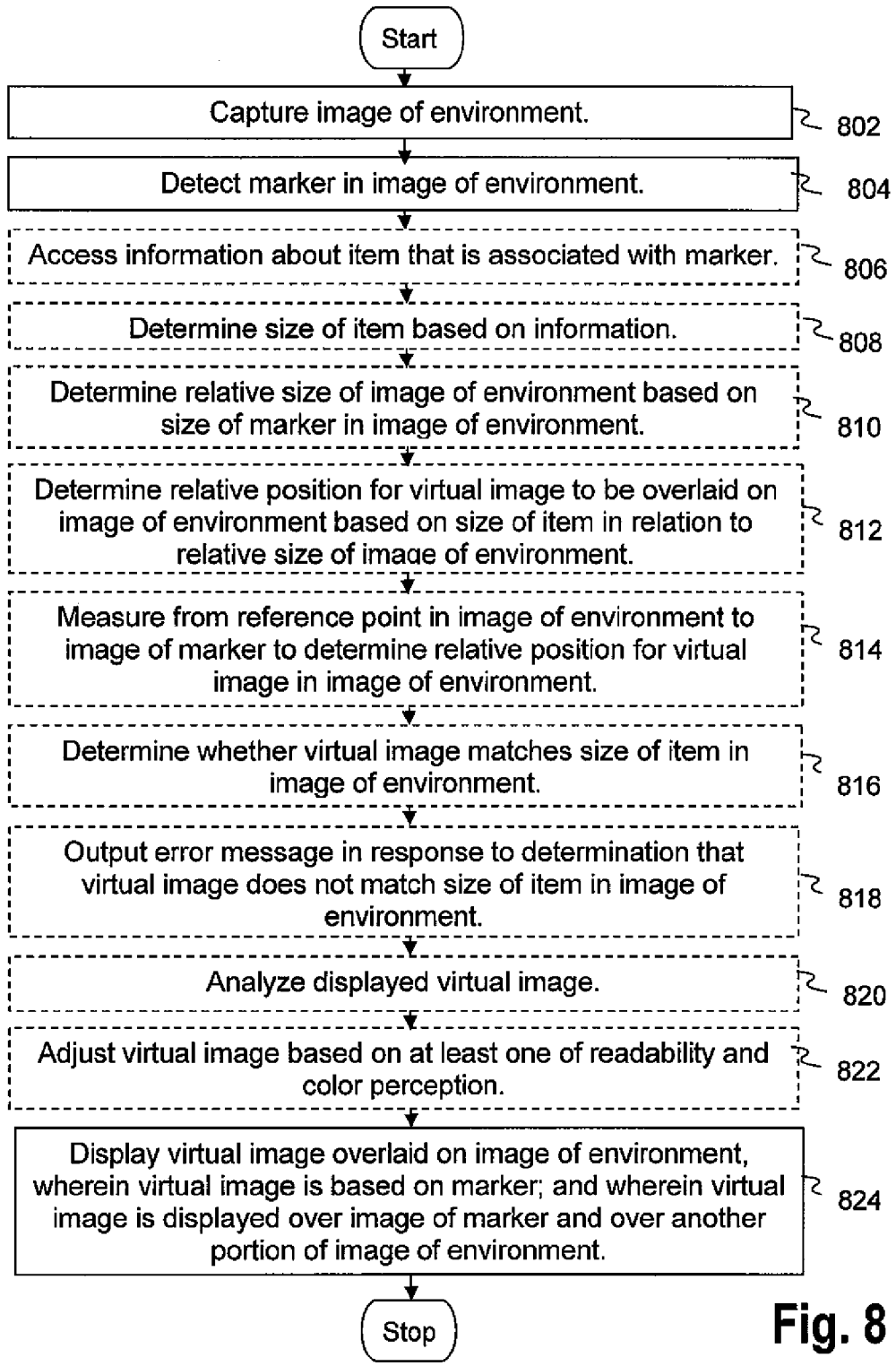
FIG. 8 is yet another flowchart of a method for markers to implement augmented reality according to some embodiments of the present disclosure.

FIG. 8 is yet another flowchart of a method for markers to implement augmented reality according to some embodiments of the present disclosure. The mobile device 102 can use the method to display virtual images at least partially over an image of a marker while leaving at least part of the image of the marker not overlaid by the virtual images and over another portion of the image of the environment.

In box 802, an image is captured of an environment. For example, the camera 118 captures the image 122 of the environment 120 that includes the images of the items 402-406, which are refrigerators, and the images of the markers 408-412.

In box 804, a marker is detected in the image of the environment. For example, the mobile device 102 detects the image of the second marker 410, which is on the second refrigerator 404.

In box 806, information about an item that is associated with the marker is optionally accessed. For example, the mobile device 102 accesses detailed product information, including height, width, and depth, about the second refrigerator 404, based on the image of the second marker 410.

In box 808, a size of the item is optionally determined based on the information. For example, the mobile device 102 determines a height and a width of the second refrigerator 404 based on the information accessed.

In box 810, the image of the environment is optionally evaluated based on a size of the marker in the image of the environment. For example, the mobile device 102 determines that the image 122 of environment 120 is one-thirty-sixth the size of the environment 120 because the height of the image of the second marker 410 is one-twelfth of an inch while the database 116 indicates that the height of the second marker 410 is three inches.

In box 812, a relative position for the virtual image is optionally determined based on the size of the item in relation to the image of the environment. For example, the mobile device 102 determines that the first virtual image 414 will be one-thirty-sixth the size of the second refrigerator 404, which is six feet tall. Because one-thirty-sixth of six feet is two inches, the mobile device 102 determines that the first virtual image 414 will be two inches high when overlaid on the image 122 of the environment 120 via the display 104.

In box 814, a distance from a reference point in the image of the environment to the image of the marker is optionally measured to determine a relative position for the virtual image in the image of the environment. For example, the mobile device 102 measures from the top of the image of the second refrigerator 404 to the image of the second marker 410 to determine that one quarter of the image of the second refrigerator 404 is visible above the image of the second marker 410. This measurement will result in one quarter of the first virtual image 414 being overlaid above the image of the second marker 410.

In box 816, whether the virtual image matches the size of the item in the image of the environment is optionally determined. For example, prior to displaying the first virtual image 414 on the image of the second refrigerator 404 via the display 104, the mobile device 102 determines whether the first virtual image 414 matches the image of the second refrigerator 404. If the database 116 provides the incorrect height for the second refrigerator 404, the size of the first virtual image 414 may be larger or smaller than the image of the second refrigerator 404. In other examples, determining whether a virtual image matches a size of an item may be part of a validation process for the item. For this example, the display 104 may project a virtual image of a piece of equipment on the image of the piece of equipment to assist the mobile device user in validating that the correct piece of equipment is about the be deployed for use.

In box 818, an error message is optionally output in response to a determination that the virtual image does not match the size of the item in the image of the environment. For example, the mobile device 102 outputs an error message in response to a determination that the two inch high first virtual image 414 is ten percent larger than the image of the second refrigerator 404. A mismatch for the first virtual image 414 may indicate that the database 116 provided some incorrect information about the second refrigerator 404, which may call into question the accuracy of the rest of the information provided by the first virtual image 414 that is overlaid on the image of the second refrigerator 404.

In box 820, the displayed virtual image is optionally analyzed. For example, the mobile device 102 analyzes the first virtual image 414 to insure that it is properly overlaid on the image of the second refrigerator 404. If the user of the mobile device 102 is not holding the mobile device 102 steady, the display 104 location calculated for overlaying the first virtual image 414 may not match the image of the second refrigerator 404.

In box 822, the display of the virtual image overlaid on the image of the environment is optionally adjusted. For example, the mobile device 102 uses a digital compass and an accelerometer to adjust the display of the first virtual image 414 on the image of the second refrigerator 404. Adjusting the display of virtual images may be helpful when the mobile device 102 is moved in relation to its initial orientation. For example, the display 104 of the mobile device 102 may overlay the detailed product information as the second virtual image 416 that appears to be fifteen inches high and depicted six inches above the six foot high second refrigerator 404. When the mobile device 102 is ten feet away from the second refrigerator 404, the display 104 may offer a perspective that enables the mobile device user to read the second virtual image 416 that includes the detailed product information.

However, when the mobile device user moves closer to the second refrigerator 404, the display 104 may offer a perspective that depicts only the second refrigerator 404 and a small amount of room above the second refrigerator 404. In this situation, the display 104 does not have sufficient room in its current perspective to display both the second refrigerator 404 and the detailed product information in their original proportions. In response, the mobile device 102 may adjust the display of the detailed product information to overlay the second refrigerator 404 so that the mobile device user may still read all of the detailed product information. Alternatively, the mobile device 102 may reduce the relative size of the detailed product information that is depicted above the second refrigerator 404 to fit the available free space above the second refrigerator 404, but not reduced so much so that the mobile device user may not read all of the detailed product information.

In box 824, a virtual image is displayed overlaid on the image of the environment, wherein the virtual image is based on the marker, and wherein the virtual image is displayed at least partially over an image of the marker and over another portion of the image of the environment. For example, the mobile device 102 displays the first virtual image 414, which is a transparent green cover, overlaid on the image of the second marker 410 and the image of the second refrigerator 404.

Virtual images overlaid on the image 122 of the environment 120 may include colors that indicate a level of matching. For example, if a user inputs desired features, including a desired price, for a refrigerator via the keys 106 of the mobile device 102, the communication server 112 communicates with the content server 114 and the database 116 to determine which refrigerator models most closely match the desired features. The content server 114 associates virtual images of different overlay colors with the image of each of the refrigerators 402-406 depending upon the level of matching. For example, the mobile device 102 overlays the color red over the image of the first refrigerator 402 that matches few of the desired features, overlays the color yellow over the image of a third refrigerator 406 that matches some of the desired features, and overlays the color green over the image of the second refrigerator 404 that matches most of the desired features. The user may briefly scan the image 122 of the environment 120 that includes the images of the three refrigerators 402-406 and quickly identify the second refrigerator 404 that matches most of the desired features and price by simply observing the colors overlaid as virtual images on the images of the refrigerators 402-406.

While most examples depict the mobile device 102 as a mobile phone with the display 104 displaying virtual images, one of skill in the art would recognize that the mobile device 102 may also use a headset with goggles, lenses, glasses, or similar viewing devices as discussed, or other coupled display devices. In some instances, the mobile device 102 may also use a projector to project the virtual images onto the environment 120, such as a projector in the mobile device 102 or a projector coupled with the mobile device 102. This projection would also "display" the virtual images as described and claimed herein.

Figure 9:
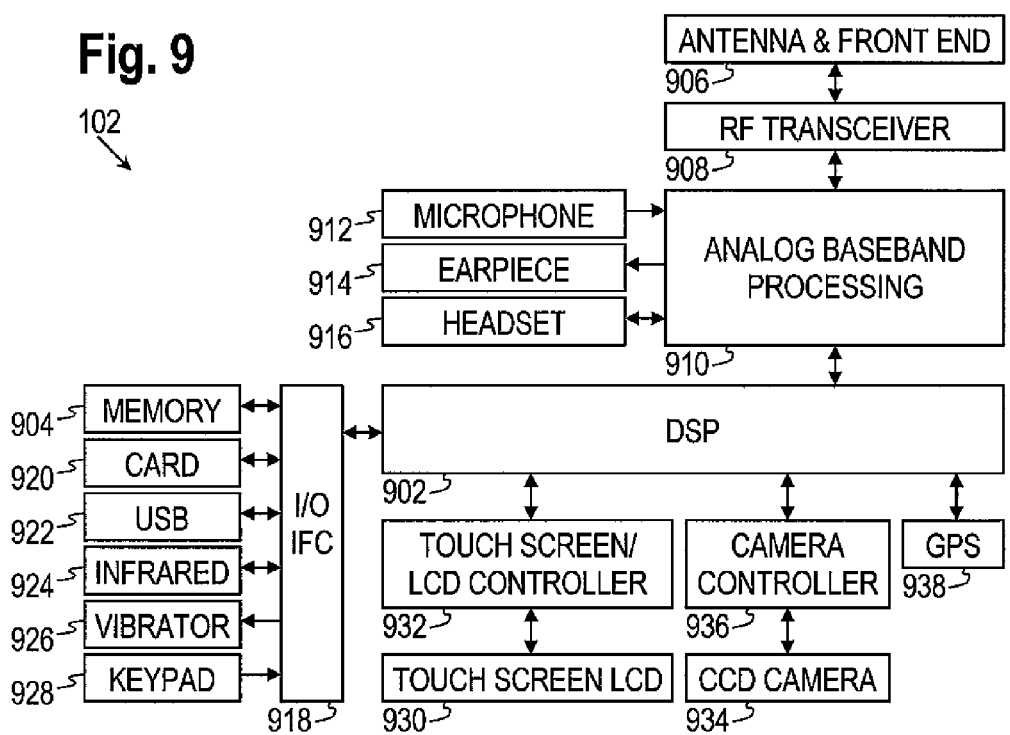
FIG. 9 is a block diagram of an illustrative mobile device.

FIG. 9 is a block diagram of the mobile device 102. While a variety of known components of mobile devices 102 are depicted, in an embodiment a subset of the listed components and/or additional components not listed may be included in the mobile device 102. The mobile device 102 includes a digital signal processor (DSP) 902 and a memory 904. As shown, the mobile device 102 may further include an antenna and front end unit 906, a radio frequency (RF) transceiver 908, an analog baseband processing unit 910, a microphone 912, an earpiece speaker 914, a headset port 916, an input/output interface 918, a removable memory card 920, a universal serial bus (USB) port 922, an infrared port 924, a vibrator 926, a keypad 928, a touch screen liquid crystal display (LCD) with a touch sensitive surface 930, a touch screen/LCD controller 932, a charge-coupled device (CCD) camera 934, a camera controller 936, and a global positioning system (GPS) sensor 938. In an embodiment, the mobile device 102 may include another kind of display that does not provide a touch sensitive screen. In an embodiment, the DSP 902 may communicate directly with the memory 904 without passing through the input/output interface 918.

The DSP 902 or some other form of controller or central processing unit operates to control the various components of the mobile device 102 in accordance with embedded software or firmware stored in memory 904 or stored in memory contained within the DSP 902 itself. In addition to the embedded software or firmware, the DSP 902 may execute other applications stored in the memory 904 or made available via information carrier media such as portable data storage media like the removable memory card 920 or via wired or wireless network communications. The application software may comprise a compiled set of machine-readable instructions that configure the DSP 902 to provide the desired functionality, or the application software may be high-level software instructions to be processed by an interpreter or compiler to indirectly configure the DSP 902.

The antenna and front end unit 906 may be provided to convert between wireless signals and electrical signals, enabling the mobile device 102 to send and receive information from a cellular network or some other available wireless communications network or from a peer mobile device 102. In an embodiment, the antenna and front end unit 906 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 906 may include antenna tuning and/or impedance matching components, RF power amplifiers, and/or low noise amplifiers.

The RF transceiver 908 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 910 and/or the DSP 902 or other central processing unit. In some embodiments, the RF Transceiver 908, portions of the antenna and front end 906, and the analog baseband processing unit 910 may be combined in one or more processing units and/or application specific integrated circuits (ASICs).

The analog baseband processing unit 910 may provide various analog processing of inputs and outputs, for example analog processing of inputs from the microphone 912 and the headset port 916 and outputs to the earpiece speaker 914 and the headset port 916. To that end, the analog baseband processing unit 910 may have ports for connecting to the built-in microphone 912 and the earpiece speaker 914 that enable the mobile device 102 to be used as a cell phone. The analog baseband processing unit 910 may further include a port for connecting to a headset or other hands-free microphone and speaker configuration. The analog baseband processing unit 910 may provide digital-to-analog conversion in one signal direction and analog-to-digital conversion in the opposing signal direction. In some embodiments, at least some of the functionality of the analog baseband processing unit 910 may be provided by digital processing components, for example by the DSP 902 or by other central processing units.

The DSP 902 may perform modulation/demodulation, coding/decoding, interleaving/deinterleaving, spreading/despreading, inverse fast fourier transforming (IFFT)/fast fourier transforming (FFT), cyclic prefix appending/removal, and other signal processing functions associated with wireless communications. In an embodiment, for example in a code division multiple access (CDMA) technology application, for a transmitter function the DSP 902 may perform modulation, coding, interleaving, and spreading, and for a receiver function the DSP 902 may perform despreading, deinterleaving, decoding, and demodulation. In another embodiment, for example in an orthogonal frequency division multiplex access (OFDMA) technology application, for the transmitter function the DSP 902 may perform modulation, coding, interleaving, inverse fast fourier transforming, and cyclic prefix appending, and for a receiver function the DSP 902 may perform cyclic prefix removal, fast fourier transforming, deinterleaving, decoding, and demodulation. In other wireless technology applications, yet other signal processing functions and combinations of signal processing functions may be performed by the DSP 902.

The DSP 902 may communicate with a wireless network via the analog baseband processing unit 910. In some embodiments, the communication may provide Internet connectivity, enabling a user to gain access to content on the Internet and to send and receive e-mail or text messages. The input/output interface 918 interconnects the DSP 902 and various memories and interfaces. The memory 904 and the removable memory card 920 may provide software and data to configure the operation of the DSP 902. Among the interfaces may be the USB port 922 and the infrared port 924. The USB port 922 may enable the mobile device 102 to function as a peripheral device to exchange information with a personal computer or other computer system. The infrared port 924 and other optional ports such as a Bluetooth interface or an IEEE 802.11 compliant wireless interface may enable the mobile device 102 to communicate wirelessly with other nearby mobile devices and/or wireless base stations.

The input/output interface 918 may further connect the DSP 902 to the vibrator 926 that, when triggered, causes the mobile device 102 to vibrate. The vibrator 926 may serve as a mechanism for silently alerting the user to any of various events such as an incoming call, a new text message, and an appointment reminder.

The keypad 928 couples to the DSP 902 via the I/O interface 918 to provide one mechanism for the user to make selections, enter information, and otherwise provide input to the mobile device 102. Another input mechanism may be the touch screen LCD 930, which may also display text and/or graphics to the user. The touch screen LCD controller 932 couples the DSP 902 to the touch screen LCD 930.

The CCD camera 934 enables the mobile device 102 to take digital pictures. The DSP 902 communicates with the CCD camera 934 via the camera controller 936. The GPS sensor 938 is coupled to the DSP 902 to decode global positioning system signals, thereby enabling the mobile device 102 to determine its position. In another embodiment, a camera operating according to a technology other than Charge Coupled Device cameras may be employed. Various other peripherals may also be included to provide additional functions, e.g., radio and television reception.

Figure 10:
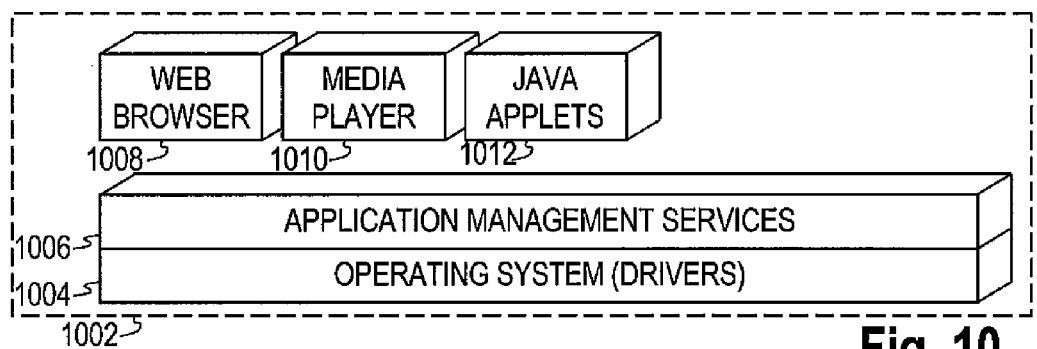
FIG. 10 is a block diagram of an illustrative software configuration for a mobile device.

FIG. 10 illustrates a software environment 1002 that may be implemented by the DSP 902. The DSP 902 executes operating system software 1004 that provides a platform from which the rest of the software operates. The operating system generally provides processing resource management support. The operating system software 1004 provides drivers for the mobile device hardware to make standardized interfaces available to application software. The operating system software 1004 may transfer control between applications running on the mobile device 102. Alternatively, an application management services 1006 component may transfer control between applications running on the handset mobile device 102. Also shown in FIG. 10 are a web browser 1008 application, a media player 1010, and application JAVA applets 1012. The web browser 1006 application configures the mobile device 102 to operate as a web browser, allowing the user to enter information into forms and select links to retrieve and view web pages. The media player 1010 application configures the mobile device 102 to retrieve and play audio or audiovisual media on its own output components. The JAVA applets 1012 may configure the mobile device 102 to provide games, utilities, and other functionality on the mobile device 102.

Figure 11:
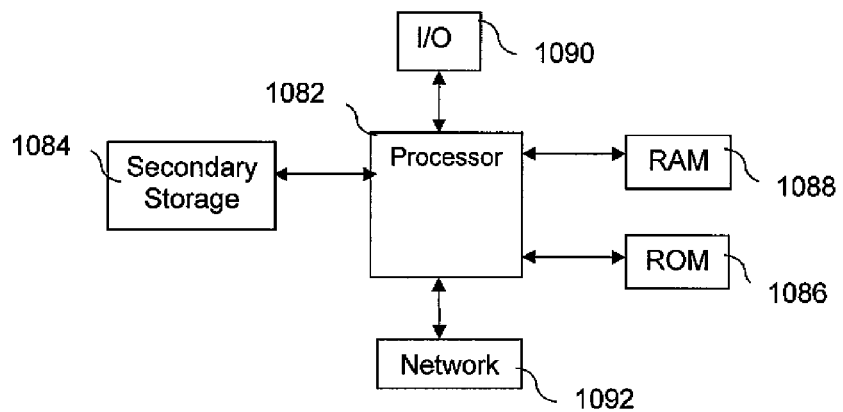
FIG. 11 illustrates an exemplary general purpose computer system suitable for implementing some aspects of the several embodiments of the disclosure.

The system described above may be implemented on any general-purpose computer with sufficient processing power, memory resources, and network throughput capability to handle the necessary workload placed upon it. FIG. 11 illustrates a typical, general-purpose computer system, suitable for implementing one or more embodiments disclosed herein. The computer system 1080 includes a processor 1082 (which may be referred to as a central processor unit or CPU) that is in communication with memory devices including secondary storage 1084, read only memory (ROM) 1086, random access memory (RAM) 1088, input/output (I/O) devices 1090, and network connectivity devices 1092. The processor may be implemented as one or more CPU chips.

The secondary storage 1084 is typically comprised of one or more disk drives or tape drives and is used for non-volatile storage of data and as an over-flow data storage device if RAM 1088 is not large enough to hold all working data. Secondary storage 1084 may be used to store programs which are loaded into RAM 1088 when such programs are selected for execution. The ROM 1086 is used to store instructions and perhaps data which are read during program execution. ROM 1086 is a non-volatile memory device which typically has a small memory capacity relative to the larger memory capacity of secondary storage. The RAM 1088 is used to store volatile data and perhaps to store instructions. Access to both ROM 1086 and RAM 1088 is typically faster than to secondary storage 1084.

I/O devices 1090 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 1092 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (COMA) and/or global system for mobile communications (GSM), and worldwide interoperability for microwave access (WiMAX) radio transceiver cards, cards, and other well-known network devices. These network connectivity devices 1092 may enable the processor 1082 to communicate with an Internet or one or more intranets. With such a network connection, it is contemplated that the processor 1082 might receive information from the network, or might output information to the network in the course of performing the above-described method steps. Such information, which is often represented as a sequence of instructions to be executed using processor 1082, may be received from and outputted to the network, for example, in the form of a computer data signal embodied in a carrier wave Such information, which may include data or instructions to be executed using processor 1082 for example, may be received from and outputted to the network, for example, in the form of a computer data baseband signal or signal embodied in a carrier wave. The baseband signal or signal embodied in the carrier wave generated by the network connectivity devices 1092 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 1082 executes instructions, codes, computer programs, scripts which it accesses from hard disk, floppy disk, optical disk (these various disk based systems may all be considered secondary storage 1084), ROM 1086, RAM 1088, or the network connectivity devices 1092. While only one processor 1082 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure.

The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method to implement augmented reality using markers, comprising:
    capturing an image of an environment that comprises a first marker and a second marker, wherein the first marker and the second marker are separate markers;
    displaying the captured image of the environment, wherein displaying the captured image of the environment comprises displaying the first marker and the second marker;
    detecting a first image of the first marker and a second image of the second marker in the displayed captured image of the environment;
    displaying a first virtual image overlaid on the displayed captured image of the environment at an offset from the first image of the first marker, wherein the first virtual image is based on the detection of the first image of the first marker;
    displaying a second virtual image overlaid on the displayed captured image of the environment, wherein the second virtual image is based on the detection of the second image of the second marker; and
    displaying a third virtual image overlaid on the displayed captured image of the environment, wherein the third virtual image is based on the detection of a combination of the first image of the first marker and the second image of the second marker, wherein the third virtual image is different from the first virtual image and the second virtual image.

2. The method of claim 1, further comprising displaying another virtual image overlaid on the displayed captured image of the environment in response to a user selection, wherein the other virtual image is based on the first marker.

3. The method of claim 1, further comprising:
    detecting another image of another marker that is indirectly associated with the first marker based on at least one of compatibility with an item directly associated with the first marker and customers purchasing pattern; and
    displaying another virtual image associated with the other marker.

4. The method of claim 1, wherein at least one of the first marker, the second marker, or the third marker comprises at least one of an asymmetrical pattern, a moving marker, a two dimensional bar code, a color light pattern, an updateable digital marker, a primary marker assigned to a marker hierarchy, a secondary marker assigned to the marker hierarchy, or a dependent marker assigned to the marker hierarchy.

5. The method of claim 1, wherein at least one of the first marker, the second marker, or the third marker is at least one of navigational information, an advertisement, information about an item in the image of the environment, specifications of a product, a schematic drawing, an operational status, an image associated with the item, an outline of the item, or a plurality of colors that indicate information about the item.

6. The method of claim 1, wherein an amount of the offset is based on the first marker, and wherein the first virtual image is displayed at least partially over the first marker and over another portion of the displayed captured image of the environment.

7. The method of claim 1, wherein displaying the first virtual image comprises displaying an animated image based on the first marker.

8. The method of claim 1, wherein the second image of the second marker is situated in the displayed captured image of the environment at a non-parallel angle from the plane of the display, and wherein a plane of the second virtual image is displayed parallel to the plane of the display to compensate for the second image of the second marker in the displayed captured image of the environment being situated at the non-parallel angle from the plane of the display.

9. The method of claim 1, wherein the second virtual image is displayed at least partially over the second image of the second marker and over another portion of the displayed captured image of the environment, and wherein the second virtual image depicts an existing item in the captured image of the environment that is blocked from view by another item in the captured image of the environment.

10. The method of claim 1, further comprising:
accessing information about an item that is associated with the first marker;
determining a size of the item based on the information;
evaluating the displayed captured image of the environment based on a size of the first image of the first marker in the displayed captured image of the environment; and
determining a relative position for the first virtual image based on the size of the item in relation to the displayed captured image of the environment.

11. The method of claim 10, further comprising:
determining whether the first virtual image matches the size of the item in the displayed captured image of the environment; and
outputting an error message in response to a determination that the first virtual image does not match the size of the item in the displayed captured image of the environment.

12. The method of claim 1, further comprising:
analyzing the displayed first virtual image; and
adjusting the displayed first virtual image based on at least one of readability and color perception.

13. The method of claim 9, wherein the second virtual image depicts an existing below-floor portion of the environment that is blocked from view by the other item in the environment, and wherein the existing below-floor portion of the environment comprises one of plumbing beneath the floor or an electrical schematic of wires and cables beneath the floor.

14. A system to implement augmented reality using markers, comprising:
a processor;
a camera associated with a mobile device configured to capture an image of an environment that comprises a first marker and a second marker, wherein the first marker and the second marker are separate markers;
a plurality of instructions in a memory, when executed by the processor detect a first image of the first marker and a second image of the second marker in a displayed captured image of the environment; and
a display associated with the mobile device, wherein the display is configured to:
display the captured image of the environment, wherein displaying the captured image of the environment comprises displaying the first marker and the second marker,
display a first virtual image overlaid on the displayed captured image of the environment at an offset from the first image of the first marker, wherein the first virtual image is based on the detection of the first image of the first marker,
displaying a second virtual image overlaid on the displayed captured image of the environment, wherein the second virtual image is based on the detection of the second image of the second marker, and
displaying a third virtual image overlaid on the displayed captured image of the environment, wherein the third virtual image is based on the detection of a combination of the first image of the first marker and the second image of the second marker, and wherein the third virtual image is different from the first virtual image and the second virtual image.

15. The system of claim 14, wherein the plurality of the instructions in the memory detect the first image of the first marker based on a perspective analysis of at least one of the first marker or the second marker in the environment.

16. The system of claim 14, further comprising a digital compass and an accelerometer to promote the instructions adjusting the display of at least one of the first virtual image, the second virtual image, or the third virtual image overlaid on the displayed captured image of the environment.

17. The system of claim 14, wherein the memory is associated with at least one of the mobile device and a server in communication with the mobile device.

18. The system of claim 14, further comprising a server that comprises a plurality of other virtual images, wherein each of the plurality of other virtual images is associated with at least one marker, and wherein the display is further configured to display one of the plurality of other virtual images based on accessing the server.

* * * * *